United States Patent Office 3,051,596
Patented Aug. 28, 1962

3,051,596
NEW NEAR INFRARED SPECTRUM FILTER MEDIA
Donald H. Baltzer, Cincinnati, Ohio, assignor to Monsanto Chemical Company, St. Louis, Mo., a corporation of Delaware
No Drawing. Filed May 16, 1958, Ser. No. 735,708
5 Claims. (Cl. 154—2.7)

The present invention is directed to filtering near infrared spectrum radiation and more particularly to media capable of selectively filtering this segment of the electro-magnetic spectrum.

The radiated energy, terrestrially effective, consists approximately of 12% ultra-violet, up to 400 millimicrons wavelength, 36.5% visible, from 400 to 700 millimicrons, and 48.5% near infrared heat rays, from 700 to 2600 millimicrons. Near infrared radiation has been noted by medical authorities as causing injury to the optic nerves and other delicate parts of the eye. Additionally, radiations of this nature are accompanied by heat which under certain conditions is undesirable. Ordinary glass absorbs a total of only about 3% for the entire spectrum mentioned and in addition reflects about 4% of the visual at each surface. Ordinary glass then, both proportionately and collectively, transmits more of the undesirable light than the desirable visual light.

Various expedients have been presented as solutions to the problem. Of the two most commonly used one is directed to vacuum coating extremely thin films of metal onto various substrates, the latter both rigid and flexible in nature, such as glass and various synthetic polymeric materials. The other utilizes multiple layers of transparent materials having selective refractive indices and controlled thicknesses. Both of these techniques, however, leave much to be desired in that infinite care is required to produce effective filter media using either technique. In spite of the care exercised media using the metalized films generally can not be cited for automotive and like purposes in that they lack selectivity and interfere with all segments of the visible spectrum as to be specularly reflective in the visible spectrum exhibiting objectionable and dangerous glare.

The function of light filtering can involve either or both absorption and reflection of the undesirable portion of the spectrum. Parenthetically, of the two, selective reflection with regard to near infrared emissions is the more desirable function in that absorption can result in secondary emissions of this undesirable portion of the spectrum from the filter medium, as well as accumulation of heat in the medium also accompanied by undesirable results. Selective reflection of near infrared emissions can be realized if a particular medium has the capacity for exercising critical anomalous dispersion. The latter can be described as follows: certain media have the capacity to realize specific absorption of sufficient intensity at a given wavelength with the result that reflectance will occur at a somewhat longer wavelength due to sharp rise in refractive index. It has now been discovered that certain rhenium oxides exhibit this phenomenon at appropriate wavelengths as to cause reflectance of at least a portion of the near infrared spectrum while nonetheless the absorption which occurs at lower wavelengths does not interfere with the transmission of the major portion of the visible spectrum.

Accordingly, it is a principal object of the present invention to provide improved near infrared spectrum filter media.

Another object is to provide such media which are lucent with respect to the visual portion of the electro-magnetic spectrum.

Other objects of the invention will in part be obvious and will in part appear hereinafter.

These and other objects are attained by providing in combination a lucent supporting material and rhenium oxide.

The following examples are provided in illustration of the present invention. Where parts are mentioned, parts by weight are intended unless otherwise indicated.

EXAMPLE I

A solution comprising about 5 parts $Re_2O_7$, rhenium heptoxide, 0.07 part aliphatic amine wetting agent, 0.06 part of polyvinyl alcohol and about 95 parts of de-ionized water are flowed onto a sheet of clean glass. The excess is allowed to drain off over a period of about 15 seconds. The glass while initially wet is given three passes at a distance of about 2½ inches and at a rate of 3 inches per minute over an electric heating bar maintained at cherry red heat. The solution, which is colorless, develops into a transparent dry film on the glass having a blue-green coloration by transmission and a coppery coloration by reflection. The film is washed with an aqueous solution of sodium hydroxide to remove unreacted $Re_2O_7$. A clean uncoated sheet of glass is placed over the film giving a sandwich structure of glass having the dry rhenium trioxide film interposed.

EXAMPLE II

The procedure according to Example I is again followed in providing a film of rhenium oxide on glass. This is laminated to another sheet of glass by first spraying a solution of plasticized polyvinyl butyral in acetone on the anticipated interface of an uncoated sheet of glass and allowing it to stand until the acetone becomes essentially evaporated and a film results. The interfaces and then brought into contact and the assembly subjected to 200 pounds pressure/inch$^2$ at 275° F. for 10 minutes.

EXAMPLE III

The procedure according to Example II is followed with the exception that a film of ethylene-vinyl acetate copolymer is provided on the anticipated interface of the uncoated sheet of glass. The assembly is subjected to 100 pounds/inch$^2$ at 275° F. for 10 minutes.

EXAMPLE IV

A solution constituting 5 parts rhenium heptoxide in 95 parts of acetone is flowed onto a sheet of clean glass and the excess allowed to drain off. The glass is then positioned in close proximity to an area heater maintained at a temperature of about 1200° F. until the solvent has become evaporated and an intense blue-green transparent film which is coppery colored on reflection develops on the glass. The film is washed with a dilute solution of ammonium hydroxide to remove the excess heptoxide. Laminates are made in the manner exemplified in Examples II and III exhibiting effective near infrared filtering.

EXAMPLE V

About 0.5 gram of rhenium heptoxide is placed in a 250 cc. beaker which is in turn placed in an oil bath maintained at between 230° F. and 350° F. A sheet of glass which has been thoroughly cleaned is placed over the beaker for a period of 10 minutes allowing a blue-green film to accrete on the under surface of the glass. This is then washed with dilute acetic acid and laminates of the type set forth in Examples II and III are fabricated by analogous methods which exhibit effective near infrared filtering.

EXAMPLE VI

A solution of the type set forth in Example I is placed in a dryer having a material trough, a cylinder for pickup of material and a heating element located above the cylinder. The heating element is a Nichrome element which is heated to red temperature. When steady state operating conditions are attained after a period of about 20 minutes, the product is scraped from the drum dryer. The particle size of this product is noted to be extremely fine averaging on the order of 0.1 micron in diameter or less. The product is washed in water to remove the unreacted rhenium heptoxide and is then dispersed in a solution of plasticized polyvinyl butyral. After an intimate dispersion is attained the solution is cast on glass and the solvents allowed to evaporate. The coating is stripped from the glass and can be used as a self-supporting infrared filter.

Films of this type presently disclosed when measured for reflection in the near infrared region exhibit reflection that starts low in the visible spectrum and increases rapidly out to 1500 millimicrons; and from there to beyond 2000 millimicrons the reflection remains essentially constant. The films are further characterized by their adhesion to glass and other substrates when applied by various coating techniques.

The thickness of the films can be regulated by consideration of the physical conditions surrounding their application. Films of a thickness that transmit 60% at 550 millimicrons wavelength will transmit approximately 35% from 700 to beyond 2000 millimicrons wavelengths.

The transmittance and reflectance of the described films for visible and/or near infrared wavelengths can be controlled somewhat in accordance with the thickness of the coating of rhenium trioxide. The effectiveness of any one such filter may be defined in terms of a performance ratio:

$$\frac{Quantity\ of\ solar\ energy}{Visible\ energy\ excluded}$$

The higher the ratio, the more effective the filter in reducing solar energy with a minimum reduction of the transmission of visible energy. Typical figures for two filters of lacquered $ReO_3$ on glass are:

| | Percent visible transmittance for noon sunlight | Performance ratio |
|---|---|---|
| (1) | 48 | 1.45 |
| (2) | 68 | 1.59 |

The following tables give the data utilized in arriving at the preceding determinations. The data are determined using a Beckman DU spectrophotometer with modified attachments for measuring reflected light and corresponding curves can be plotted, if desired. The values for transmittance (T), reflectance (R) and absorption (A) are determined for the filter medium (1).

*Table A*

[48% visible transmittance for noon sunlight]

| Wavelength range, millimicrons | Percent solar energy | From trans. and refl. curves T+R+A=1 | | | Parts of solar heat excluded | | | Parts of visible lost (R+½A) |
|---|---|---|---|---|---|---|---|---|
| | | Percent trans. (T) | Percent refl. (R) | Percent absorp. (A) | By R | By A | Total (R+½A) | |
| 400–500 | 12.5 | 0.34 | | 0.66 | | 8.25 | 4.13 | 8.25 |
| 500–600 | 12.7 | 0.29 | 0.01 | 0.70 | 0.13 | 8.89 | 4.58 | 9.02 |
| 600–700 | 11.2 | 0.08 | 0.06 | 0.86 | 0.67 | 9.63 | 5.49 | 10.30 |
| 700–800 | 9.3 | 0.05 | 0.115 | 0.835 | 1.07 | 7.77 | 4.96 | |
| 800–900 | 7.7 | 0.05 | 0.155 | 0.795 | 1.19 | 6.12 | 4.13 | |
| 900–1,000 | 6.3 | 0.045 | 0.18 | 0.775 | 1.13 | 4.88 | 3.57 | |
| 1,000–1,100 | 4.5 | 0.06 | 0.21 | 0.73 | 0.95 | 3.29 | 2.60 | |
| 1,100–1,200 | 4.0 | 0.07 | 0.245 | 0.685 | 0.98 | 2.74 | 2.35 | |
| 1,200–1,300 | 3.1 | 0.08 | 0.27 | 0.65 | 0.84 | 2.02 | 1.85 | |
| 1,300–1,400 | 2.5 | 0.085 | 0.285 | 0.63 | 0.71 | 1.58 | 1.50 | |
| 1,400–1,500 | 2.0 | 0.10 | 0.29 | 0.61 | 0.58 | 1.22 | 1.19 | |
| 1,500–1,600 | 1.7 | 0.13 | 0.31 | 0.54 | 0.53 | 0.92 | 0.99 | |
| 1,600–1,700 | 1.5 | 0.155 | 0.315 | 0.53 | 0.47 | 0.80 | 0.87 | |
| 1,700–1,800 | 1.1 | 0.17 | 0.315 | 0.515 | 0.35 | 0.57 | 0.64 | |
| 1,800–1,900 | 1.0 | 0.19 | 0.320 | 0.49 | 0.32 | 0.49 | 0.57 | |
| 1,900–2,000 | 0.8 | 0.20 | 0.320 | 0.48 | 0.26 | 0.38 | 0.45 | |
| Total | | | | | | | 39.87 | 27.57 |

Note.—P.R.=$\frac{39.87}{27.57}$=1.45 (units of heat excluded per unit of visible light sacrificed).

And the following for filter medium (2):

*Table B*

[68% visible transmittance for noon sunlight]

| Wavelength range, millimicrons | Percent solar energy | From trans. and refl. curves T+R+A=1 | | | Parts of solar heat excluded | | | Parts of visible lost (R+½A) |
|---|---|---|---|---|---|---|---|---|
| | | Percent trans. (T) | Percent refl. (R) | Percent absorp. (A) | By R | By A | Total (R+½A) | |
| 400–500 | 12.5 | 0.495 | | 0.505 | | 6.31 | 3.16 | 6.31 |
| 500–600 | 12.7 | 0.465 | 0.01 | 0.525 | 0.127 | 6.67 | 3.47 | 6.80 |
| 600–700 | 11.2 | 0.255 | 0.075 | 0.670 | 0.84 | 7.50 | 4.59 | 8.34 |
| 700–800 | 9.3 | 0.16 | 0.115 | 0.725 | 1.07 | 6.74 | 4.44 | |
| 800–900 | 7.7 | 0.16 | 0.15 | 0.69 | 1.16 | 5.31 | 3.82 | |
| 900–1,000 | 6.3 | 0.17 | 0.18 | 0.65 | 1.13 | 4.10 | 3.18 | |
| 1,000–1,100 | 4.5 | 0.18 | 0.21 | 0.61 | 0.95 | 2.75 | 2.33 | |
| 1,100–1,200 | 4.0 | 0.195 | 0.24 | 0.565 | 0.96 | 2.26 | 2.09 | |
| 1,200–1,300 | 3.1 | 0.215 | 0.26 | 0.525 | 0.81 | 1.63 | 1.63 | |
| 1,300–1,400 | 2.5 | 0.23 | 0.28 | 0.49 | 0.70 | 1.23 | 1.32 | |
| 1,400–1,500 | 2.0 | 0.25 | 0.275 | 0.475 | 0.55 | 0.95 | 1.03 | |
| 1,500–1,600 | 1.7 | 0.28 | 0.28 | 0.44 | 0.48 | 0.75 | 0.86 | |
| 1,600–1,700 | 1.5 | 0.31 | 0.28 | 0.41 | 0.42 | 0.62 | 0.73 | |
| 1,700–1,800 | 1.1 | 0.325 | 0.28 | 0.395 | 0.31 | 0.43 | 0.53 | |
| 1,800–1,900 | 1.0 | 0.35 | 0.275 | 0.375 | 0.28 | 0.38 | 0.47 | |
| 1,900–2,000 | 0.8 | 0.37 | 0.265 | 0.365 | 0.21 | 0.29 | 0.36 | |
| Total | | | | | | | 34.01 | 21.45 |

Note.—P.R.=$\frac{34.01}{21.45}$=1.59 (units of heat excluded per unit of visible light sacrificed).

The present invention is directed to production of near infrared spectrum filter media comprising in combination lucent supporting material and an oxide of rhenium.

The supporting materials which can be used include those which are lucent in nature, i.e., either transparent or translucent. Glass and various synthetic polymeric materials can be used for this purpose including polyvinyl butyral, polyvinyl chloride, polystyrene, polyurethanes, polyvinyl alcohol, cellulose acetate, cellulose nitrate, ethyl cellulose, alkyd resins, acrylics, butyrates, shellac, etc. The term "support materials" is intended to include those materials which are utilized as substrates on which the rhenium oxide film is deposited by coating through spraying, brushing, and the like. In addition, it is intended to include overlays, adhesives and barriers with which to occlude the films, as well as being directed to materials in which the rhenium oxide is incorporated by milling, mixing, rolling, or prior to this such as during polymerization or production of the substrate material.

The support materials are preferably those which exhibit chemical inertness toward the film, but it is possible to utilize other materials which are not inert in a particular assembly by interposing inert barriers which are then considered to be support materials as previously noted. As an example, vinyl acetate-maleic anhydride copolymers can be used for this purpose. This can also be realized by utilization of adhesives which are inert to the film and as a consequence have the further function of contributing additional adhesive bonding between the various overlays and substrates to facilitate production of laminates.

The oxides of rhenium which can be used are blue-green in coloration and are theorized as being the trioxides. In accordance with this characterization further reduction of this oxide results in a product which is grayer and less attractive for present purposes, while further oxidation contributes a product which lacks coloration. Stabilization of the desired oxide can be enhanced by association with catechol, triphenyl phosphite, syringic acid, methacrylic acid, etc. In addition various vehicles such as organic solvents including dioxane, ethyl alcohol, methyl alcohol and various esters and ketones which do not affect the oxidation state of the oxide can be used. When provided in liquid environment, the oxide can be applied by spraying and analogous methods. It is also possible to apply the material in a dry form to the various substrates. The trioxide can be produced in situ, or in the supporting material as well as being produced elsewhere and later applied.

The products which are attained through practice of the present invention have broad utility. Visual panels fabricated from the same can be used in optical, construction and vehicular applications. In particular, windows and the like constituted according to the present invention are conducive to easing eye strain and the reduction of undesirable heat accumulation, the latter an important economic factor in air conditioning and the like. The products which result exhibit a pleasant blue-green coloration which does not interfere substantially with visual perspective, and which can be further modified by the addition of compatible colorants or dye stuffs added to the film or to the supporting material.

It will thus be seen that the objects set forth above, among those made apparent in the preceding description, are efficiently attained and, since certain changes can be made in the above product or its production or fabrication without departing from the scope of the invention, it is intended that all matter contained shall be interpreted as illustrative and not in a limiting sense.

What is claimed is:

1. A near infrared spectrum filter medium comprising in combination a lucent supporting material and rhenium trioxide, the said rhenium trioxide having a blue-green coloration by transmission.

2. A near infrared spectrum filter medium comprising a lucent supporting material having incorporated therein rhenium trioxide, the said rhenium trioxide having a blue-green coloration by transmission.

3. A near infrared spectrum filter medium comprising a lucent supporting material being coated with rhenium trioxide, the said rhenium trioxide having a blue-green coloration by transmission.

4. A near infrared spectrum laminate filter comprising a pair of lucent laminae having interposed a film of rhenium trioxide, the said rhenium trioxide having a blue-green coloration by transmission.

5. The filter according to claim 4 wherein the laminae are provided at their interfaces with an adhesive.

References Cited in the file of this patent

UNITED STATES PATENTS

| | | |
|---|---|---|
| 1,604,761 | Sherts | Oct. 26, 1926 |
| 2,564,708 | Mochel | Aug. 21, 1951 |
| 2,624,239 | Blout et al. | Jan. 6, 1953 |
| 2,758,510 | Auwarter | Aug. 14, 1956 |
| 2,854,349 | Dreyfus et al. | Sept. 30, 1958 |
| 2,861,896 | Kraus | Nov. 25, 1958 |

OTHER REFERENCES

Mellor: "Comprehensive Treatise on Inorganic and Theoretical Chemistry," vol. 12 (1932), pp. 473 and 474 relied upon. (One copy available in Div. 59.)